Patented Mar. 17, 1925.

1,530,121

UNITED STATES PATENT OFFICE.

CHARLES W. HOOPER, OF JAMAICA, NEW YORK, ASSIGNOR TO H. A. METZ LABORATORIES, INC., OF NEW YORK, N. Y.

ALDOSE PREPARATION OF ALKYL ESTERS OF AMINO-BENZOIC ACIDS.

No Drawing.  Application filed September 29, 1923. Serial No. 665,717.

*To all whom it may concern:*

Be it known that I, CHARLES W. HOOPER, a citizen of the United States, residing at Jamaica, in the county of Queens and State of New York, have invented certain new and useful Improvements in Aldose Preparations of Alkyl Esters of Amino-Benzoic Acids, of which the following is a specification.

This invention relates to aldose preparations of the alkyl esters of the amino- and the amino-hydroxy-benzoic acids, hereinafter referred to generically as the alkyl esters of amino-benzoic acids, suitable for use as local anesthetizing agents.

It is known that alkyl esters of amino-benzoic acids possess more or less strong anesthetizing properties when in direct contact with exposed nerve ends. These compounds are however insoluble or only slightly soluble in water and animal tissue fluids, and therefore do not penetrate intact skin or mucous membrane and cannot be injected into tissue hypodermically in the form of water solutions, their use being limited to application to wounds, ulcers, burns, rhagades, excoriations, etc., where they may come in contact with exposed nerve ends. The compounds moreover do not contain a basic group which is capable of forming neutral water soluble salts suitable for use as anesthetizing agents and the acid salts of the compounds although soluble in water have such severe irritative and corrosive action that they are not suitable for use.

I have found that water soluble preparations or compounds of the alkyl esters of the amino-benzoic acids for example the alkyl esters of p-amino-benzoic acid, the alkyl esters of p-amino-m-hydroxy-benzoic acid and the alkyl esters of m-amino-p-oxdy-benzoic acid, possessing strong anesthetizing properties and having no unpleasant secondary effects, such as the irritative and corrosive action referred to, may be obtained by dissolving the esters in solutions of or combining them with aldoses, either the mono-saccharides or the disaccharides, having a functional aldehyde group such as glucose, maltose, lactose and analogous aldoses.

The preparation of the aldose compositions or compounds of the alkyl amino-benzoic acids is illustrated in the following examples in connection with which, however, it is noted that the invention and the patent protection solicited are not limited to the specific products, the preparation of which is illustrated, or to the specific procedure described, excepting as may be indicated in the appended claims. In this connection it is noted particularly that the invention is not limited to the use of the particular alkyl esters or to the use of the particular aldoses named.

*Example I.*

Suspended 16.7 grams of the methyl esters of m-amino-p-hydroxy-benzoic acid in 33 grams of a water solution of gluocose containing 60 per cent by weight of glucose and gently heat the mixture until a clear yellowish solution is formed. This ordinarily is accomplished by heating the mixture for from 10 to 15 minutes on a boiling water bath. The resulting solution if rapidly cooled forms a solid cake showing needle-shaped crystals. If however the hot solution which contains the methyl ester of m-amino-p-hydroxy-benzoic acid and glucose in equimolecular proportions or a chemical combination thereof is diluted with about 85 to 350 grams of a water solution of glucose containing from 40 per cent to 60 per cent of glucose and allowed to stand and cool, a jelly possessing strong anesthetizing properties is obtained.

*Example II.*

Suspend 16.5 grams of the ethyl ester of p-amino-benzoic acid in 33 grams of a water solution of glucose containing 60 per cent by weight of glucose and heat the mixture until a clear yellow solution is formed. This is accomplished ordinarily by heating the mixture for from 30 to 45 minutes on a boiling water bath. The resulting solution if rapidly cooled forms a solid cake containing needle-like crystals. If however the solution which contains the ethyl ester of p-amino-benzoic acid and glucose in equimolecular proportions or a chemical combination thereof is diluted with about 85 to 350 grams of a water solution of glucose containing from 40 per cent to 60 per cent of glucose and allowed to stand and cool, a jelly having strong anesthetizing properties is obtained.

Example III.

Suspend 16.7 grams of the methyl ester of m-amino-p-hydroxy-benzoic acid and 16.5 grams of the ethyl ester of p-aminobenzoic acid in 180 grams of a water solution of glucose containing 60 per cent by weight of glucose and gently heat the mixture until a clear yellowish solution is formed. This is accomplished ordinarily by heating the mixture for from 10 to 15 minutes on a boiling water bath. The resulting solution upon rapid cooling and standing gives a gelatinous cake containing crystals in the form of needles which melt when heated on a boiling water bath and may be diluted with water to give relatively stable neutral solutions of any desired strength. This preparation has been tested clinically and has been found to be of low toxicity even when injected directly into the blood stream. When applied to mucous membrane or injected into the tissues it causes no irritation or corrosion and produces a strong anesthetizing effect.

As has been indicated the aldose preparations may be merely mixtures or they may consist of or comprise chemical combinations of the aldoses with the alkyl esters of the amino-benzoic acids.

I claim:

1. As new products, combinations of aldoses and alkyl esters of amino-benzoic acids.

2. As new products, water soluble non-irritating preparations having anesthetizing properties such as may be prepared by the herein described process which comprises dissolving alkyl esters of amino-benzoic acids in water solutions of aldoses.

3. As new products, water soluble non-irritating preparations having anesthetizing properties such as may be prepared by the herein described process which comprises dissolving alkyl esters of amino-benzoic acids in water solutions of aldoses in substantially equimolecular proportions and diluting the resulting solutions with solutions of aldoses.

4. As new products, combinations of equimolecular proportions of aldoses and alkyl esters of amino-benzoic acids dissolved in solutions of aldoses.

5. As new products, combinations of glucose with alkyl esters of amino-benzoic acids.

6. As new products, combinations of aldoses with alkyl esters of p-amino-benzoic acid, alkyl esters of p-amino-m-oxy-benzoic acid and alkyl esters of m-amino-p-hydroxy-benzoic acid.

7. As new products, water soluble non-irritating compositions having anesthetizing properties, said products being combinations of glucose with alkyl esters of p-amino-benzoic acid, alkyl esters of p-amino-m-hydroxy-benzoic acid, and m-amino-p-hydroxy-benzoic acid in substantially equimolecular proportions dissolved in water solutions of glucose.

8. As a new product, a combination of glucose with the methyl ester of m-amino-p-hydroxy-benzoic acid and the ethyl ester of p-amino-benzoic acid, said product being soluble in water giving relatively stable neutral solutions of any desired strength and having strong anesthetizing properties and substantially no irritative effect upon animal tissues.

In testimony whereof, I affix my signature.

CHARLES W. HOOPER.